US006994407B2

(12) United States Patent
Kinder et al.

(10) Patent No.: US 6,994,407 B2
(45) Date of Patent: Feb. 7, 2006

(54) METHOD AND DEVICE FOR CONTROLLING THE BRAKING EQUIPMENT OF A MOTOR VEHICLE

(75) Inventors: Ralf Kinder, Eitelborn (DE); Gerhard Klapper, Boppard (DE); Reza Shokoufandeh, Conventry (GB); Franz-Josef Endres, Sessenhause (DE); Ralf Leiter, Vallendar (DE); Lorenz Maack, Böblingen (DE); Andreas Söns, Grafenau (DE)

(73) Assignee: Lucas Automotive GmbH, (DE)

( * ) Notice: Subject to any disclaimer, the term of this patent is extended or adjusted under 35 U.S.C. 154(b) by 0 days.

(21) Appl. No.: 10/464,162

(22) Filed: Jun. 18, 2003

(65) Prior Publication Data

US 2003/0227215 A1 Dec. 11, 2003

Related U.S. Application Data

(63) Continuation of application No. PCT/EP01/14944, filed on Dec. 18, 2001.

(30) Foreign Application Priority Data

Dec. 18, 2000 (DE) ................................ 100 63 062

(51) Int. Cl.
*B60T 8/32* (2006.01)

(52) U.S. Cl. ....................................................... 303/191

(58) Field of Classification Search .................. 303/89, 303/113.1, 113.4, 133, 191, 192, 155; 188/265; 192/219, 219.1, 220.1, 220.2
See application file for complete search history.

(56) References Cited

U.S. PATENT DOCUMENTS 4,116,296 A * 9/1978 Pleier et al. ................ 180/273

(Continued)

FOREIGN PATENT DOCUMENTS

| | | | |
|---|---|---|---|
| DE | 24 20 252 | | 10/1975 |
| DE | 36 18 532 | | 12/1986 |
| DE | 196 48 055 | | 6/1998 |
| DE | 198 25 642 | | 12/1999 |
| DE | 199 09 326 | | 9/2000 |
| DE | 10121158 | A1 * | 11/2001 |
| EP | 1 048 538 | | 11/2000 |

OTHER PUBLICATIONS

Document Bibliography and Abstract for DE 3618532 from the http://12.espacenet.com/espacenet/viewer?PN= DE 3618532&CY=ep&LG=en&DB=EPD, printed Jun. 4, 2003.

(Continued)

*Primary Examiner*—Thomas Williams
(74) *Attorney, Agent, or Firm*—MacMillan, Sobanski & Todd, LLC

(57) ABSTRACT

The present invention relates to a method and a device for controlling braking equipment of a motor vehicle. Here, an operating state of a motor vehicle is determined, in which the motor vehicle is to be brought from a state, in which its speed is not zero, into a state, in which the vehicle no longer moves. If such a transition from a traveling state into a state of standstill is determined, braking equipment of the motor vehicle is controlled such that braking forces are produced, which are capable of bringing the motor vehicle into the state of standstill and/or assisting a vehicle driver in doing this. It is also possible to produce braking forces in the state of standstill, which are capable of holding the motor vehicle in the state of standstill. The present invention additionally enables to assist a vehicle driver when starting a motor vehicle. In this case, an operating state of the motor vehicle is detected in which the motor vehicle is to be brought from a state of standstill into a traveling state. If such an operating state is present, the braking equipment of the motor vehicle is controlled such that the braking forces produced by the braking equipment in the state of standstill are reduced in such a way as to allow a transition into the traveling state and/or to assist the vehicle driver in this respect.

40 Claims, 2 Drawing Sheets

U.S. PATENT DOCUMENTS

| | | | | |
|---|---|---|---|---|
| 4,684,177 | A * | 8/1987 | Ha | 303/191 |
| 4,717,207 | A | 1/1988 | Kubota et al. | |
| 4,848,852 | A * | 7/1989 | Inoue et al. | 303/155 |
| 5,706,909 | A * | 1/1998 | Bevins et al. | 180/273 |
| 5,984,429 | A | 11/1999 | Nell et al. | 303/113.4 |
| 6,056,373 | A * | 5/2000 | Zechmann et al. | 303/191 |
| 6,056,374 | A * | 5/2000 | Hiwatashi | 303/192 |
| 6,269,295 | B1 * | 7/2001 | Gaugush et al. | 192/220.1 |
| 6,286,617 | B1 * | 9/2001 | DeLuca et al. | 303/191 |
| 6,370,466 | B1 * | 4/2002 | Hada et al. | 303/89 |
| 6,502,908 | B1 * | 1/2003 | Mueller et al. | 303/191 |
| 6,554,744 | B2 | 4/2003 | Schmidt | |
| 6,875,153 | B2 * | 4/2005 | Jager et al. | 477/71 |

OTHER PUBLICATIONS

Document Bibliography and Abstract for DE 19909326 from the http://12.espacenet.com/espacenet/viewer?PN=DE19909326&CY=ep&LG=en&DB=EPD, printed Jun. 4, 2003.

Document Bibliography and Abstract for EP 1048538 from the http://12.espacenet.com/espacenet/viewer?PN=EP1048538&CY=ep&LG=en&DB=EPD, printed Jun. 4, 2003.

* cited by examiner

METHOD AND DEVICE FOR CONTROLLING THE BRAKING EQUIPMENT OF A MOTOR VEHICLE

CROSS REFERENCE TO RELATED APPLICATIONS

This application is a continuation of International Application No. PCT/EP01/14944 filed Dec. 18, 2001, the disclosures of which are incorporated herein by reference, and which claimed priority to German Patent Application No. 100 63 062.6 filed Dec. 18, 2000, the disclosures of which are incorporated herein by reference.

The present invention relates to a method and a device for controlling braking equipment of a motor vehicle. The present invention relates in particular to a method and a device for controlling braking equipment during a so-called "stop-and-go" operation of a motor vehicle, in which successive operating states alternate with braking, parked and starting phases.

BACKGROUND OF THE INVENTION

According to the Kraftfahrttechnisches Taschenbuch, Robert Bosch GmbH, 20th edition, page 502 ff., the term "braking equipment" is understood to mean all brake systems of a motor vehicle for the purpose of reducing its speed, bringing it to a standstill as well as holding it at a standstill. Braking equipment generally encompasses a service brake, a holding brake and an auxiliary braking means.

The service braking means makes it possible to reduce the speed of the motor vehicle during its normal traveling operation or to bring the motor vehicle to a standstill. The service braking means is usually controlled by a vehicle driver either manually and/or by foot by means of a suitable actuating mechanism (e.g. brake pedal) and/or by a vehicle control for controlling the traveling operation ("cruise control", "Tempomat").

The "holding braking means" is usually embodied separately from the service braking means and makes it possible to predetermine and maintain braking forces for the motor vehicle. The holding braking means is normally used to safely hold the motor vehicle at a standstill even in the absence of the vehicle driver. The holding braking means is usually actuated by the vehicle driver either manually and/or by foot in order to predetermine a desired braking force. Actuating mechanisms for holding braking means are generally designed such that a predetermined braking force is maintained until the vehicle driver takes appropriate measures such as, e.g., again actuating the respective actuating mechanism ("releasing a hand brake").

The "auxiliary braking means" generally serves to partly or completely provide the function of the service braking means should the latter malfunction. Means of the service and/or holding braking means are usually also used for the auxiliary braking means. It is thus possible, for example, that one brake circuit of a service braking means with a plurality of brake circuits or the holding braking means takes over the function of the auxiliary braking means.

Various solutions are known to increase the ease of operation of a motor vehicle for operating states, in which the braking equipment is used (in part), and to increase the safety obtained in the operation of braking equipment during traveling and standstill phases of a vehicle.

For example, so-called "braking assistants", which assist a vehicle driver when actuating a service braking means, are used in vehicles. Especially in the case of operating states of a vehicle, in which high braking forces are required in brief periods, the braking assistant controls the service braking means in dependence of a current operating state of the vehicle so as to increase the provided braking force in comparison with a braking force, which would be produced just by the vehicle driver without using the braking assistant.

From DE-OS-24 20 252 it is known to activate and de-activate the holding brake of a motor vehicle in dependence of a position of an accelerator pedal. In this case, the holding brake is activated to produce a fixedly predetermined braking force when the accelerator pedal is not actuated. The holding brake is accordingly de-activated, whereby the fixedly predetermined braking force is reduced as soon as the accelerator pedal is actuated.

According to DE 199 09 326 A1, and corresponding U.S. Pat. No. 6,554,744, both of which are incorporated by reference herein, an accelerator pedal having a rest position and a neutral position is used to control a braking force generator of a motor vehicle. The accelerator pedal can be moved from its rest position into its neutral position, from which a further movement results in an increase in the driving torque and engine performance, respectively, of the motor vehicle engine. Positions of the accelerator pedal between the rest position and the neutral position are not used to control the motor vehicle. In order to brake the motor vehicle during traveling operation without actuating a brake pedal, the braking force generator builds up a previously specified braking force when the accelerator pedal reaches its rest position. The braking force generator accordingly reduces the specified braking force in controlled manner when the accelerator pedal leaves its rest position in order to accelerate the motor vehicle again. The motor vehicle may alternatively be braked by determining a movement of the accelerator pedal from the neutral position into the rest position and using the braking force generator to build up the previously specified braking force according to the determined accelerator pedal movement. In this case, if the motor vehicle is accelerated again, a movement of the accelerator pedal from the rest position into the neutral position is determined and the braking force generator is controlled to reduce the previously specified braking force according to the accelerator pedal movement.

A starting assistance for a motor vehicle on a slope and a method for controlling the starting assistance is known from DE 36 18 532 A1, and corresponding U.S. Pat. No. 4,717,207, both of which are incorporated by reference herein. Here, a brake system comprises, disposed between the master brake cylinder and the wheel brake cylinders, a valve, which is closed or opened in order to maintain or release the brake actuating pressure. The brake actuating pressure produced by the vehicle driver by means of the brake pedal is maintained when the motor vehicle is stopped and, especially, when it is stopped on a slope. For this purpose, the valve of the brake system is closed when it is ascertained, on the basis of parameters, which characterize the actual operating state of the motor vehicle, that the motor vehicle stands. In order to determine the standstill of the motor vehicle, a check is carried out as to whether the actual traveling speed is zero, whether the clutch is released, whether the first gear or the reverse gear is engaged and whether the angle of inclination of the motor vehicle corresponds to or is greater than a predetermined angle of inclination. If these conditions are fulfilled, the valve is closed and the vehicle driver can release the brake pedal without the motor vehicle then moving as the braking force required for standstill is maintained by means of the valve. The brake actuating pressure can be increased by the vehicle driver actuating the brake pedal again, in which case the valve again serves to maintain the re-set brake actuating pressure.

When the motor vehicle is brought into a traveling state from standstill, the instantaneous torque, which is produced by the vehicle's engine, is detected and compared with an engine torque, which is necessary for starting the stopping motor vehicle. Here, the engine torque required for starting may be a predetermined nominal torque of the engine, which is corrected with regard to the angle of inclination and in dependence of the weight of the motor vehicle. If the instantaneous engine torque corresponds to or is greater than the engine torque required for starting, the valve is opened, whereby the previously maintained brake actuating pressure is reduced.

A conventional torque sensor on the engine, a torque sensor along the drive train from the engine to the wheels, a sensor associated to the clutch or an arrangement comprising two switches disposed on a rotatable part may be used to determine the engine torque. The two switches, which may be disposed, for example, on brake shoes of the wheel brakes, detect a rotation of the rotatable part as well as the direction thereof in order to determine the actual engine torque from these.

If, when the motor vehicle is in the state of standstill described above, it is determined that the holding brake of the vehicle has been actuated by the vehicle driver, i.e. is applied, the valve of the brake system is not closed. If the vehicle driver no longer actuates the brake pedal when the motor vehicle is in this state, the brake actuating pressure therefore drops rather than being maintained by the valve.

The devices described above have disadvantages, which is why they are in particular unsuitable for use in a "stop-and-go" operation or do not represent any assistance for a vehicle driver.

Thus, braking assistants serve to assist a vehicle driver in the generation of a braking force, in particular when emergency braking. As described above, braking assistants are activated upon recognition of an operating state of the vehicle brake system for emergency braking. Operating states of this kind do not normally occur in a "stop-and-go" operation, which is why braking assistants are not activated in this case.

According to DE-OS-24 20 252, the braking force of the holding brake is provided abruptly when the accelerator pedal is in an unloaded position. Accordingly, the holding brake is released abruptly, i.e. the braking force is removed abruptly, when the accelerator pedal is loaded. In this case, a fixedly predetermined braking force, which is not adapted to the current operating state of the motor vehicle, is provided by the holding brake in its actuated state. This means that, for example, the fixedly predetermined braking force may be insufficient for holding the motor vehicle at a standstill when it is on a slope. Moreover, the holding brake is always activated when the accelerator pedal is in an unloaded position. The holding brake is consequently also activated during traveling operation of the motor vehicle, so that unwanted or uncontrollable traveling states may occur, especially at high speeds. This type of actuation of the holding brake also increases wear as the holding brake does not, as intended, just provide braking forces when the motor vehicle is at a standstill.

According to DE 199 09 326 A1, and corresponding U.S. Pat. No. 6,554,744, both of which are incorporated by reference herein, the brake system provides braking force in dependence of positions or movements of the accelerator pedal. The purpose of this is to control the traveling speed of the motor vehicle without additional actuation of the brake pedal in traveling states. Therefore, there it is not possible to let the motor vehicle roll when the accelerator pedal is not actuated, which is desirable in particular where a "stop-and-go" operation is concerned, as braking forces are always automatically produced in this case. Furthermore, any actuation of the brake pedal de-activates the control of the brake system via the accelerator pedal. The brake system described therein consequently behaves like a conventional brake system when the vehicle is brought to a standstill by actuating the brake pedal.

The starting assistance according to DE 36 18 532 A1, and corresponding U.S. Pat. No. 4,717,207, both of which are incorporated by reference herein, only automatically provides braking forces if the vehicle is already at a standstill. As long as the vehicle is still moving, the brake system described therein operates in a conventional manner and consequently does not assist the vehicle driver in a "stop-and-go" operation.

SUMMARY OF THE INVENTION

An object of the present invention is to provide a method and a device for controlling braking equipment of a motor vehicle, which assist the vehicle driver in a "stop-and-go" operation and to make this more comfortable, while avoiding the above-mentioned disadvantages of the state of the art.

In order to achieve this object, the invention provides a method for controlling braking equipment of a motor vehicle, wherein an operating state of a motor vehicle is determined, in which the vehicle from a state, in which its speed is not zero, is to be brought into a state, in which its speed is zero. If such a transition from a traveling state into a state of standstill is recognized, braking equipment of the motor vehicle is controlled automatically, i.e. by means of an electrical/electronic control means without actuation by a vehicle driver, such that braking forces are built up, which are capable of holding the motor vehicle in the state of standstill having reached the same.

Here, it is possible to control the braking equipment such that the transition into the state of standstill is assisted by building up braking forces, which are capable of bringing the motor vehicle into the state of standstill. In this case, the actuation of the braking equipment by the vehicle driver may be assisted or replaced, or the braking equipment produces the braking forces desired here without previous actuation by the vehicle driver.

The present invention also provides a method for controlling braking equipment of a motor vehicle, wherein an operating state of a motor vehicle is detected, in which the motor vehicle is to be brought from a state of standstill, in which the traveling speed of the motor vehicle is zero, into a traveling state. If such an operating state is present, braking equipment of the motor vehicle is controlled such that the braking forces produced by the braking equipment in the state of standstill are reduced in such a way as to allow a transition into the traveling state. Here too, the controlled actuation, to be more precise the controlled de-activation, of the braking equipment takes place without any actuation by the vehicle driver, which reduces the braking force.

In order to allow a transition in the traveling state jerk-free as much as possible and to avoid increased loads or damages of the braking equipment, in particular of brake linings, when reducing the braking forces during a starting event, the respective operation state of the motor vehicle can be controlled during reduction of the braking forces. Here, in particular, it is contemplated to reduce, at least for a short period of time, the rotational engine speed and/or the motor torque of the motor vehicle when starting and during a reduction of braking forces occurring along therewith. In particular in case of a powerful acceleration events (racing start), in this manner, the reduction of braking forces and the building up of driving power acting on the wheels can be coordinated with respect to each other. Independence of the reduction of the braking forces, the engine speed and/or the motor torque can be brought to a value desired and predefined, respectively, by the vehicle driverjump-wise, stepwise, linearly or according to a different function in order to enable the desired starting event.

The two above-mentioned methods for controlling braking equipment are preferably used together in order to assist a vehicle driver in a "stop-and-go" operation of a motor vehicle both in braking events and in starting events.

Parameters, which characterize the current operating state of the vehicle, and/or control signals, which indicate a transition into and/or from the state of standstill, may be used to detect or determine the current operating state of the motor vehicle.

Here, it is contemplated to use as operating state parameters for the motor vehicle at least one of the quantities, which define the speed, the acceleration, the transverse acceleration, the yaw rates, the inclination, the engine speed, the effective driving torque, the speed of one or more wheels, the transmission state (i.e. the engaged gear), positions and/or movements of an accelerator pedal, positions and/or movements of a brake pedal, positions and/or movements of a clutch pedal, the steering angle and the operating state of the braking equipment are in this case.

Where quantities, which indicate the state of the braking equipment are concerned, preferable, corresponding quantities for individual or more components of the braking equipment, such as, e.g. a service braking means, a holding braking means and an auxiliary braking means should be determined.

Parameters of this kind may be provided by means of corresponding sensors and/or by signals, which are delivered by existing control and/or regulating means of the vehicle.

The control signals, which indicate a transition into or from the state of standstill, include signals generated by a control and/or regulating means of the vehicle and/or by a vehicle driver. Examples of signals provided by the vehicle include signals which indicate whether the vehicle ignition is turned on, whether safety means of the vehicle for protecting passengers (e.g. belt systems, airbags) are activated or de-activated, whether electronic/electrical/mechanical components of the motor vehicle (e.g. engine management systems, ABS, stability and traction control systems, brake boosters) are activated/de-activated and/or are operating faultlessly, as well as signals from distance sensors, which indicate the distance of the motor vehicle from other motor vehicles and objects.

The control signals may also be generated by a vehicle driver voice controlled and/or by actuating corresponding input means (e.g. switches, keys).

Further, it is contemplated to automatically de-activate the drive train of the motor vehicle when there is a transition from the traveling state into the state of standstill and vice versa or when reaching the state of standstill. It is therefore no longer necessary to actuate a clutch to uncouple the drive train and/or a transmission in order to adopt an idle position during a transition into the state of standstill or in the state of standstill. If the motor vehicle has an automatic transmission, this may be controlled so as to change over to a so-called "neutral position" or "parking position" during a transition into the state of standstill or in the state of standstill. When using a conventional transmission, which can be actuated by a vehicle driver, actuators can be used, which actuate the clutch and/or the transmission accordingly.

Preferably, a service braking means and/or a holding braking means and/or an auxiliary braking means is/are controlled when controlling the braking equipment.

It is consequently possible to activate the holding braking means and/or the auxiliary braking means after a specified period after reaching the state of standstill in order, for example, to provide the braking force previously produced by the service braking means. The holding braking means and/or the auxiliary braking means can accordingly be controlled when the motor vehicle is in the operating state, in which it is to be brought into the traveling state, such that the holding braking means is de-activated when this operating state is detected. It may in this respect be necessary to control the service braking means such that it initially provides a braking force having been produced by the holding braking means in the state of standstill, wherein the service braking means is controlled when there is a transition from the state of standstill into the traveling state so as to make a transition into the traveling state possible. As an alternative it is contemplated to activate the holding braking means for a further specified period when the motor vehicle is to be brought into the traveling state. At the end of the further period braking forces, which are required for a transitionin to the traveling state, are then produced by the holding braking means alone or in combination with the service braking means and/or the auxiliary braking means.

The activation and/or de-activation of the holding braking means may additionally or alternatively be carried out in dependence of the parameters, which characterize the current operating state of the motor vehicle, and/or the control signals, which indicate the transition into and/or from the state of standstill.

These parameters and/or control signals may also be used to specify at least one of the above-mentioned time ranges for the holding braking means.

In addition, these parameters and/or control signals may serve, when controlling the braking equipment, to activate and/or de-activate its components individually or in combination.

The features of the device according to the invention for controlling braking equipment of the motor vehicle and of advantageous embodiments thereof as well as of a computer program product are defined in the accompanying claims.

Various objects and advantages of this invention will become apparent to those skilled in the art from the following detailed description of the preferred embodiment, when read in light of the accompanying drawings.

BRIEF DESCRIPTION OF THE DRAWINGS

In the following description of preferred embodiments reference is made to the accompanying figures, of which shows.

DETAILED DESCRIPTION OF THE INVENTION

Figure 1:
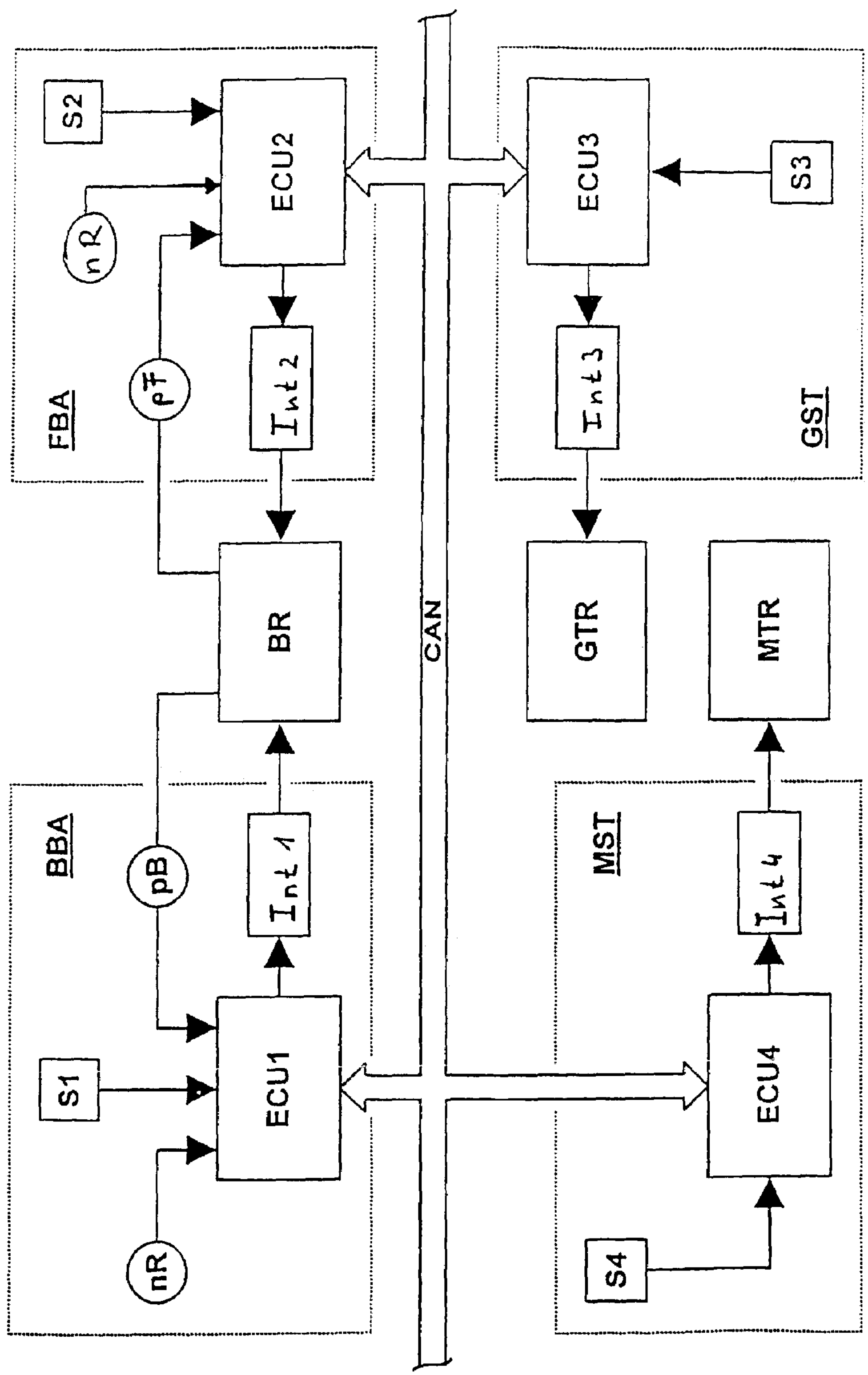
FIG. 1 a schematic representation of a device according to the invention for controlling braking equipment of a motor vehicle together with further components of the motor vehicle, and FIG. 2 a schematic graphical representation of a "stop-and-go" operation of a motor vehicle.

According to FIG. 1, braking equipment of a motor vehicle, which is not shown, comprises a controllable service brake system BBA and a controllable holding brake system FBA, which together or individually actuate brakes BR of the motor vehicle. A transmission control GST for a transmission GTR and an engine control MST for an engine MTR as further vehicle equipment (vehicle components), can be also seen in FIG. 1.

The service brake system BBA comprises a control unit ECU1, a sensor means S1 and sensors nR and bP. The control unit ECU1 serves to control the service brake system BBA using signals from the sensor means S1 and the sensors nR and pB. Quantities/parameters, which indicate an operation of the service brake system desired by a vehicle driver, are detected by the sensor means S1. Depending on the respective application, the sensor means S1 detects positions and/or movements of a brake pedal (not shown), positions of a brake light switch, positions and/or movements of an accelerator pedal (not shown) and similar.

Rotational speed values of individual or more wheels of the motor vehicle are sensed by the sensor nR and the braking forces produced by the brakes BR are sensed by the sensor pB. The data provided by the sensor means S1 and the sensors nR and pB are used by the control unit ECU1 in order to control the brakes BR via a mechanical and/or electronic interface Int1, as described in the following.

The holding brake system FBA comprises a control unit ECU2, a sensor means S2 and sensors nR and pF. A braking force desired by the vehicle driver, which is to be produced by means of the holding brake system FBA, is determined by means of the sensor means S2. In this respect, the sensor means S2 can detect a position of the brake pedal, in which, e.g., the brake pedal is completely actuated, the state of an automatic transmission for a neutral or parking position, the actuation of an actuating mechanism for the holding brake system FBA (e.g. hand brake lever, on-off switch) or other signals inputted directly by the vehicle driver for example using a voice input means which characterize a desired operating state of the holding brake system FBA. The sensor pF detects the braking force, which is produced by the brakes BR, while the sensor nR, as described above, detects rotational wheel speed values. Using the data provided by the sensor means S2 and the sensors pF and nR, the control unit ECU1 controls the brakes BR via a mechanical and/or electronic interface Int2.

The control units ECU1 and ECU2 are connected to a control unit ECU3 of the transmission control GST and a control unit ECU4 of the engine control MST via a bus system CAN of the motor vehicle. The transmission control GST and the engine control MST comprise sensors S3 and S4, respectively, which are capable of detecting quantities/parameters, which are used in addition to the data provided by the control units ECU1 and ECU2 to operate the transmission control GST and the engine control MST, respectively.

The transmission control GST and the engine control MST are connected via interfaces Int3 and Int4, respectively, to the transmission GTR and the engine MTR, respectively, in order to control the transmission GTR and the engine MTR.

Figure 2:
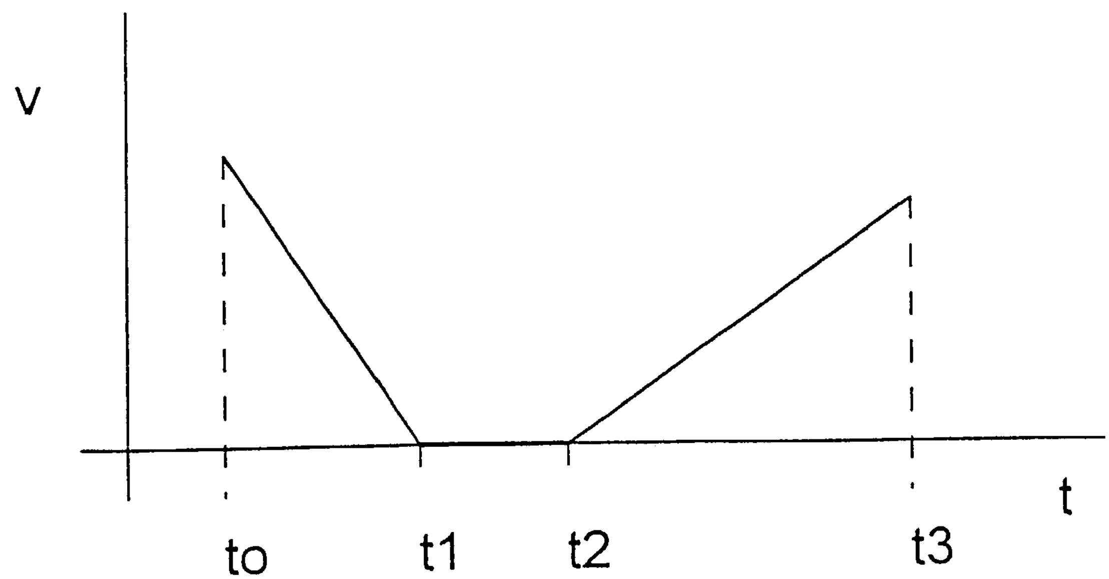

The operation of the arrangement illustrated in FIG. 1 is explained with reference to the traveling speed course of the motor vehicle, as represented in FIG. 2, during a "stop-and-go" operation.

According to FIG. 2, a braking phase for the motor vehicle begins at an instant $t_0$ and ends at an instant $t_1$. The motor vehicle is then at a standstill. At an instant $t_2$, at which the standstill phase ends, a starting phase for the motor vehicle begins, ends at an instant $t_3$, and changes over to a traveling phase not illustrated.

The instant $t_0$ and, thus, the beginning of the braking phases determined using the data provided by the sensor means S1 and the sensors nR and pB. The service brake system BBA is controlled during the braking phase, i.e. in the time range between $t_0$ and $t_1$, such that it assists the vehicle driver to brake the motor vehicle and bring it to a standstill. The brakes BR are controlled by the holding brake system upon reaching the state of standstill at the instant $t_1$. Here, it is provided that the control of the brakes BR at the instant $t_1$ changes over from the service brake system BBA to the holding brake system FBA in continuous or stepped manner during a time period following the instant $t_1$.

If quantities/parameters, which are input directly by the vehicle driver and indicate a desired operating state for the holding brake system FBA, are detected by means of the sensor means S2 to control the holding brake system FBA, the transition of the control of the brakes BR to the holding brake system FBA occurs at instants or during time periods, which are determined and/or predetermined in dependence of signals from the sensor means S2.

If there is to be a change from the state of standstill at the instant $t_2$, i.e. the starting phase begins, the holding brake system FBA is de-activated and the service brake system BBA controls the brakes BR to produce braking forces. The service brake system BBA is controlled in the starting phase is such a way to achieve a starting phase desired by the vehicle driver. Here, positions and/or movements of the accelerator pedal should be determined by means of the sensor means S1 in order to control the brakes BR, i.e. reduce the braking forces produced for the state of standstill, in accordance thereof.

In the braking phase, i.e. during the entire braking phase or during individual or a plurality of time periods comprised therein, the transmission control GST is controlled using data from the control unit ECU1 and the sensor means S3 to operate the transmission GTR so as to assist the braking operation. The sensor means S3 detects the actual operating state of the transmission GTR, to be more precise the gear being actually engaged. According to the respective operating state of the service brake system BBA and the transmission GTR, in case of using a semiautomatic or an automatic transmission for the transmission GTR, the control unit ECU3 is controlled to select higher transmission ratios in order to additionally brake the motor vehicle due to the higher engine braking force resulting therefrom. In the case of a conventional non-automatic transmission, which is actuated directly by the vehicle driver, optical indicator elements disposed in the field of view of the vehicle driver may be used in order to instruct the vehicle driver to select higher transmission ratios (to change to a lower gear).

The engine control MST can assist braking the motor vehicle during or in the braking phase by controlling the engine MTR in dependence of the data from the control unit ECU1 and the sensor means S4. An air-fuel mixture, which is actually supplied to the engine MTR, for example, can be determined by means of the sensor means S4. The detected air-fuel ratio is then varied with regard to the corresponding operating state of the service brake system BBA such that the engine MTR delivers a lower torque.

The transmission GTR is brought into an idle state and/or the fuel supply to the engine MTR is interrupted in the standstill phase, i.e. during the entire standstill phase or for individual or more time ranges thereof.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. Method for controlling braking equipment of a motor vehicle, comprising the following steps:

determining an operating state of a motor vehicle, in which the motor vehicle is to be brought from a traveling state into a state of standstill, and controlling braking equipment of the motor vehicle so that, independently of any actuation of the braking equipment by a vehicle driver, braking forces are built up, which are capable of holding the motor vehicle in the state of standstill having reached the same, characterized in that a drive train of the motor vehicle is automatically de-activated in the state of standstill.

2. Method according to claim 1, wherein at least one of parameters, which characterize the current operating state of the vehicle, and control signals, which indicate at least one of a transition into the state of standstill and a transition from the state of standstill, is used to determine the operating state of the motor vehicle.

3. Method according to claim 1, wherein quantities, which indicate a current operating state of the braking equipment, are determined to control the braking equipment.

4. Method according to claim 3, wherein the operating state quantifies of the braking equipment are determined for at least one of a service braking means, a holding braking means, and an auxiliary braking means.

5. Method according to claim 1, wherein at least one of a drive train and an engine of the motor vehicle is automatically controlled, when there is at least one of a transition from the traveling state into the state of standstill and a transition from the state of standstill into the traveling state, such that at least one of forces and moments is produced, which, in addition to the braking forces produced by the braking equipment, function to at least one of brake the motor vehicle and assist a transition into the traveling state.

6. Method according to claim 1, wherein at least one of a service braking means, a holding braking means, and an auxiliary braking means is controlled when controlling the braking equipment.

7. Method according to claim 6, wherein at least one of the holding mechanism and the auxiliary braking means is activated after a predetermined period after reaching the state of standstill.

8. Method according to claim 6, wherein at least one of the holding braking means and the auxiliary braking means is de-activated in the operating state, in which the vehicle is to be brought from the state of standstill into the traveling state.

9. Computer program product, comprising:

program code portions for carrying out the steps according to claim 1.

10. Computer program product according to claim 9, stored on a computer readable recording medium or in a computer readable storage device.

11. Method according to claim 1 further characterized in that an engine of the motor vehicle is automatically de-activated in the state of standstill.

12. Method for controlling braking equipment of a motor vehicle, comprising the following steps:

determining an operating state of a motor vehicle, in which the motor vehicle is to be brought from a state of standstill into a traveling state, and controlling braking equipment of the motor vehicle so that the braking forces, which are produced in the state of standstill by the braking equipment, can be reduced independently of any actuation of the braking equipment by a vehicle driver in such a way as to allow a transition into the traveling state, characterized in that a drive train of the motor vehicle is automatically de-activated in the state of standstill.

13. Method according to claim 12, wherein the operating state of the motor vehicle is controlled in dependence of acting braking forces when reducing the braking forces.

14. Method according to claim 13, wherein when controlling the operating state of the motor vehicle at least one of an engine speed and an engine torque of the motor vehicle is controlled.

15. Method according to claim 12, wherein at least one of parameters, which characterize the current operating state of the vehicle, and control signals, which indicate at least one of a transition into the state of standstill and a transition from the state of standstill, is used to determine the operating state of the motor vehicle.

16. Method according to claim 12, wherein quantities, which indicate a current operating state of the braking equipment, are determined to control the braking equipment.

17. Method according to claim 16, wherein the operating state quantities of the braking equipment are determined for at least one of a service braking means, a holding braking means and an auxiliary braking means.

18. Method according to claim 12, wherein at least one of a drive train and an engine of the motor vehicle is automatically controlled, when there is at least one of a transition from the traveling state into the state of standstill and a transition from the state of standstill into the traveling state, such that at least one of forces and moments are produced, which, in addition to the braking forces produced by the braking equipment, function to at least one of brake the motor vehicle and assist a transition into the traveling state.

19. Method according to claim 12, wherein at least one of a service braking means, a holding braking means and an auxiliary braking means is controlled when controlling the braking equipment.

20. Method according to claim 19, wherein at least one of the holding mechanism and die auxiliary braking means is activated after a predetermined period after reaching the state of standstill.

21. Method according to claim 19, wherein at least one of the holding braking means and the auxiliary braking means are de-activated in the operating state, in which the vehicle is to be brought from the state of standstill into the traveling state.

22. Computer program product, comprising:

program code portions for carrying out the steps according to claim 12.

23. Computer program product according to claim 22, stored on a computer readable recording medium or in a computer readable storage device.

24. Method according to claim 12 further characterized in that an engine of the motor vehicle is automatically de-activated in the state of standstill.

25. Method for controlling braking equipment of a motor vehicle, comprising the following steps:

determining an operating state of a motor vehicle, in which the motor vehicle is to be brought from a traveling state into a state of standstill then brought from the state of standstill into the traveling state, controlling braking equipment of the motor vehicle so that, independently of any actuation of the braking equipment by a vehicle driver, braking forces are built up, which are capable of holding the motor vehicle in the state of standstill having reached the same, and controlling braking equipment of the motor vehicle so that the braking forces, which are produced in the state of standstill by the braking equipment, can be reduced independently of any actuation of the braking equipment by a vehicle driver in such a way as to allow a transition into the traveling state, characterized in that a drive train of the motor vehicle is automatically de-activated in the state of standstill.

26. Device for controlling braking equipment of a motor vehicle, comprising:

detection means for determining an operating state of a motor vehicle, in which the motor vehicle is to be brought from a traveling state into a state of standstill, and control units for controlling braking equipment of the motor vehicle in order to build up, independently of any actuation of the braking equipment by a vehicle driver, braking forces, which are capable of holding the motor vehicle in the state of standstill having reached this same, characterized by a means for automatically de-activating a drive train of the motor vehicle in the state of standstill.

27. Device according to claim 26, in which the de-activation means comprises:

a detection means for detecting an operating state of a transmission of the motor vehicle, and a control unit for the transmission.

28. Device according to claim 26, in which the de-activation means comprises:

a detection means for detecting an operating state of an engine of the motor vehicle, and a control unit for controlling the engine.

29. Device according to claim 26, in which the detection means are adapted to detect at least one of parameters, which characterize the current operating state of the motor vehicle, and control signals, which indicate at least one of a transition into the state of standstill and a transition from the state of standstill.

30. Device according to claim 26, in which the control units comprise at least one of a control unit for a service braking means, a control unit for a holding braking means and a control unit for an auxiliary braking means.

31. Device according to claim 26 further characterized by a means for automatically de-activating an engine of the motor vehicle in the state of standstill.

32. Device for controlling braking equipment of a motor vehicle, comprising:

detection means for determining an operating state of a motor vehicle, in which the motor vehicle is to be brought from a state of standstill into a traveling state, and control units for controlling braking equipment of the motor vehicle in order to reduce braking forces produced in the state of standstill independently of any actuation of the braking equipment by a vehicle driver, so as to allow a transition into the traveling state, characterized by a means for automatically de-activating a drive train of the motor vehicle in the state of standstill.

33. Device according to claim 32, in which the de-activation means comprises:

a detection means for detecting an operating state of a transmission of the motor vehicle, and a control unit for the transmission.

34. Device according to claim 32, in which the de-activation means comprises:

a detection means for detecting an operating state of an engine of the motor vehicle, and a control unit for controlling the engine.

35. Device according to claim 32, in which the detection means are adapted to detect at least one of parameters, which characterize the current operating state of the motor vehicle, and control signals, which indicate at least one of a transition into the state of standstill and a transition from the state of standstill.

36. Device according to claim 32, in which the control units comprise at least one of a control unit for a service braking means, a control unit for a holding braking means and a control unit for an auxiliary braking means

37. Device according to claim 32 further characterized by a means for automatically de-activating an engine of the motor vehicle in the state of standstill.

38. Device for controlling braking equipment of a motor vehicle, comprising:

detection means for determining an operating state of a motor vehicle, in which the motor vehicle is to be brought from a traveling state into a state of standstill then brought from the state of standstill into the traveling state, control units for controlling braking equipment of the motor vehicle in order to build up, independently of any actuation of the braking equipment by a vehicle driver, braking forces, which are capable of holding the motor vehicle in the state of standstill having reached this same, and control units for controlling braking equipment of the motor vehicle in order to reduce braking forces produced in the state of standstill independently of any actuation of the braking equipment by a vehicle driver, so as to allow a transition into the traveling state, characterized by a means for automatically de-activating a drive train of the motor vehicle in the state of standstill.

39. Method for controlling braking equipment of a motor vehicle, comprising the following steps:

determining an operating state of a motor vehicle, in which the motor vehicle is to be brought from a state of standstill into a traveling state then brought from the traveling state into the state of standstill, controlling braking equipment of the motor vehicle so that the braking forces, which are produced in the state of standstill by the braking equipment can be reduced independently of any actuation of the braking equipment by a vehicle driver in such a way as to allow a transition into the traveling state, and controlling braking equipment of the motor vehicle so that, independently of any actuation of the braking equipment by a vehicle driver, braking forces are built up, which are capable of holding the motor vehicle in the state of standstill having reached the same, characterized in that a drive train of the motor vehicle is automatically de-activated in the state of standstill.

40. Device for controlling braking equipment of a motor vehicle, comprising:

detection means for determining an operating state of a motor vehicle, in which the motor vehicle is to be brought from a state of standstill into a traveling state then brought from the traveling state into the state of standstill, control units for controlling braking equipment of the motor vehicle in order to reduce braking forces produced in the state of standstill independently of any actuation of the braking equipment by a vehicle driver, so as to allow a transition into the traveling state, and control units for controlling braking equipment of the motor vehicle in order to build up, independently of any actuation of the braking equipment by a vehicle driver, braking forces, which are capable of holding the motor vehicle in the state of standstill having reached this same, characterized by a means for automatically deactivating a drive train of the motor vehicle in the state of standstill.

* * * * *

UNITED STATES PATENT AND TRADEMARK OFFICE

CERTIFICATE OF CORRECTION

PATENT NO. : 6,994,407 B2
DATED : February 7, 2006
INVENTOR(S) : Ralf Kinder et al.

It is certified that error appears in the above-identified patent and that said Letters Patent is hereby corrected as shown below:

Column 10,
Line 41, delete "die" and insert -- the --.

Column 12,
Line 48, after "equipment" insert -- , --.

Signed and Sealed this

Fourth Day of April, 2006

JON W. DUDAS
*Director of the United States Patent and Trademark Office*